United States Patent

Bachhofer et al.

[11] Patent Number: 6,060,681
[45] Date of Patent: May 9, 2000

[54] PROCESS AND APPARATUS FOR LASER WELDING

[75] Inventors: Andreas Bachhofer, Stuttgart; Alfons Rief, Dettenhausen, both of Germany

[73] Assignee: DaimlerChrysler AG, Germany

[21] Appl. No.: 09/022,445

[22] Filed: Feb. 12, 1998

[30] Foreign Application Priority Data

Feb. 12, 1997 [DE] Germany .......................... 197 05 278

[51] Int. Cl.[7] .................................................. B23K 26/00
[52] U.S. Cl. .................. 219/121.63; 219/78.15; 219/83; 219/82; 219/121.14; 219/121.64
[58] Field of Search ............................ 219/121.63, 78.15, 219/83, 82, 121.14, 121.64

[56] References Cited

FOREIGN PATENT DOCUMENTS

| 0 200 098 A2 | 11/1986 | European Pat. Off. . |
| 0 622 150 A1 | 11/1994 | European Pat. Off. . |
| 58103988 | of 1981 | Japan . |
| 58-103988 | 6/1983 | Japan . |
| 06182571 | of 1992 | Japan . |
| 6-182571 | 7/1994 | Japan . |

*Primary Examiner*—Patrick Ryan
*Assistant Examiner*—M. Alexandra Elve
*Attorney, Agent, or Firm*—Evenson, McKeown, Edwards & Lenahan, P.L.L.C.

[57] ABSTRACT

In a process and apparatus for laser welding two metal sheets which overlap to form a flange seam and which are pressed together in the area of the flange seam, the metal sheets and the laser beam are moved relative to one another. Welding is performed using a laser beam situated in the plane of the flange seam. The metal sheets are simultaneously spread apart, at a position situated in front of the laser beam in the welding direction, and the laser beam is beamed into the area of the gap base of the spread-apart metal sheets.

11 Claims, 2 Drawing Sheets

PROCESS AND APPARATUS FOR LASER WELDING

BACKGROUND AND SUMMARY OF THE INVENTION

This application claims the priority of German patent document 197 05 278.9, the disclosure of which is expressly incorporated by reference herein.

The invention relates to a process and an arrangement for laser welding two metal sheets which overlap to form a flange seam and which are pressed together in the area of the flange seam, during the welding operation, the metal sheets and the laser beam being moved relative to one another and the welding being caused by a laser beam situated in the plane of the flange seam.

A process as well as an arrangement for the straight bead welding of container bodies by means of a laser beam are known from German Patent Document DE 36 30 889 A1. According to the process described therein, the sheet metal edges of workpieces being welded together are brought into a position such that together they form an acute angle. In order to produce a weld seam, a laser beam is then aimed into the opening formed by this acute angle. In this case, the arrangement has, among other things, several pressure rollers for fixating or for permitting the advancement of the metal sheet.

However, this process has the disadvantage that it can only produce a weld seam that is inaccurately positioned on the metal sheets to be welded together. It is even possible that the weld seam may fail to contact one of the metal sheets at all in one area.

German Patent Document DE 39 02 292 A1 describes a process for the additional welding of the connection area of lids, which are connected with a container body by folding, using a laser beam as well as an arrangement for carrying out such a process.

The insufficient positioning precision of the weld seam produced by the laser beam, in the case of this process and the connected arrangement is also a disadvantage.

For improving the positioning of the weld seam in the case of the known laser welding processes, seam tracking or search systems can be used. These, however, require high expenditures and correspondingly increase the cost of the welding arrangements.

For the welding of fuel tanks, roll seam welding, which belongs to the resistance welding processes, is known from the general state of the art.

In the past, fuel tanks were usually manufactured from steel. Lately, however, because of the general tendency in automobile manufacturing toward light-weight construction, these tanks have increasingly been made of aluminum. Roll seam welding is problematic and results in an increased energy requirement, in the case of aluminum. This is due to the higher thermal conductivity and the lower melting point of aluminum. Laser welding is thus used, in an attempt to solve this problem.

It is therefore an object of the invention to provide a process and an arrangement for laser welding by means of which the welding operation in general can be improved and the weld advancing speed can be increased. Furthermore, an accurate positioning of the weld seam with respect to the metal sheets to be welded together is to be achieved.

This and other objects and advantages are achieved according to the invention by spreading the metal sheet edges apart during the welding operation. In this manner, a geometry is provided such that, at any point in time of the welding operation, the laser beam can be aimed at a position that is precisely known in advance. As the result, a wedge-shaped weld seam is obtained which is precisely defined at any point in time.

In comparison to other welding processes, e.g., the known roll seam welding process, a significantly higher weld seam advancement speed is advantageously achievable. Moreover, the rejection rate is minimal because of the reduction of process defects.

Furthermore, by means of the process according to the invention, the flange width can be reduced. This contributes to a considerable saving of materials.

Additional possible advantageous developments of the invention are found in the subclaims and the embodiments described in principle in the following by means of the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
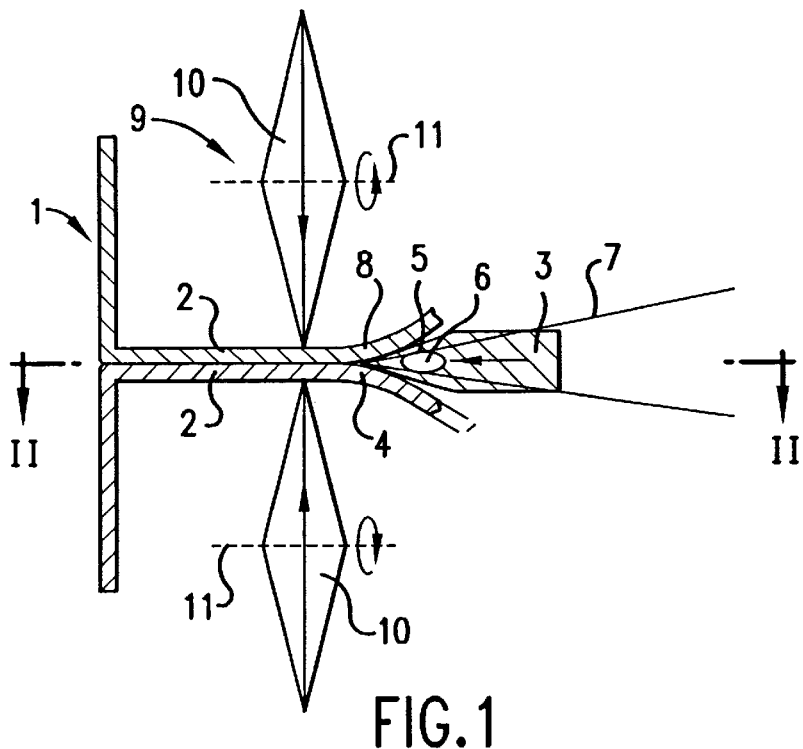
FIG. 1 is a view of a process for welding together two metal sheets by means of a laser beam with the aid of an arrangement according to the invention in a first embodiment.

According to FIG. 1, a workpiece 1, for example, a container (fuel tank) is shown as a cutout which in this case is made into a container by two correspondingly shaped and mutually overlapping metal sheets 2. The metal sheets 2 may consist of the same or different metallic materials, may be constructed with or without a coating and may have the same or different material thicknesses. The metal sheets 2, whose thickness is usually between 0.5 mm and 3 mm, are spread apart at their ends by means of a wedge-shaped spreading member 3 and are flanged to the outside. This creates a gap 4 between the metal sheets 2 which is required for the welding.

The spreading member 3 has a diagonal bore 5 which is provided for guiding through a welding wire 6. This permits a dragging feeding of the welding wire 6 by the spreading member 3, in which case the feeding angle may be in a range of between 5° and 45°. A piercing feeding of welding wire 6 by the spreading member 3 is naturally also possible. In this case, the feeding rate of welding wire 6 is usually between 0 and 10 mm³/mm.

By means of a laser beam 7 directed into the base of the gap 4, a wedge-shaped flange seam 8 is produced in a manner known per se by the melting-open of the welding wire 6.

Simultaneously, the spreading member, at the weld advancing speed, at which the workpiece 1 is guided past the spreading member 3 and the laser beam 7, spreads open the metal sheets 2 in a simultaneous continuous manner directly in front of the laser beam 7. As a result, a precise position is determined for the impinging of the laser beam 7 in the gap 4 between the metal sheets 2. Therefore, the length difference between the ends of the metal sheets 2 or other process-caused tolerances, such as the fold formation, flange width deviations, thickening or spring-back of the metal sheets, no longer play a role because, as the result of the flanging, an exact geometry is provided at the point of the flange seam 8.

Perpendicularly to the spreading direction, a pressing device 9 is arranged, which has two pressure rollers 10 as contact pressure elements, by which the metal sheets 2 are continuously pressed together. The pressure rollers 10, whose axes of rotation 11 are situated in parallel to the plane of the flange seam 8, can move the workpiece 1 past the laser beam 7 and the spreading member 3 at the weld advancing speed. As a result, the advancing for the workpiece can be taken over.

Instead of advancing the workpiece 1, the laser beam 7 together with the spreading member 3 can naturally be moved at the weld advancing speed within the scope of the invention along the workpiece 1 which is stationary in this case. A combined movement is also possible.

Figure 2:
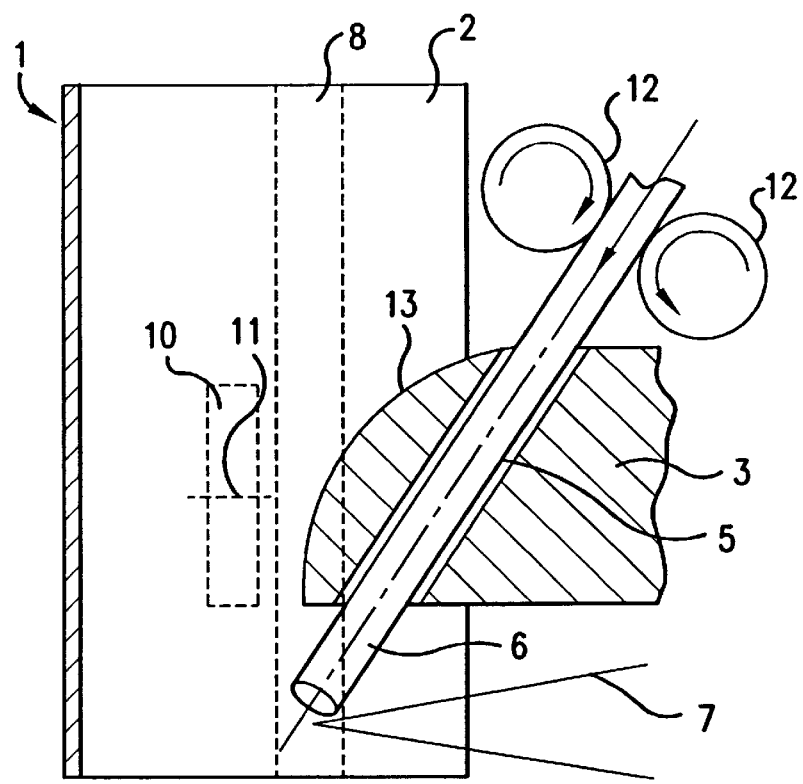
FIG. 2 is a sectional view according to Line II—II of FIG. 1.

In addition to FIG. 1, FIG. 2 shows how the advancing of the welding wire 6 through the bore 5 in the spreading member 3 is achieved by means of two rollers 12. This figure also shows a rounding 13 which is arranged on the spreading member 3 and facilitates the bending-open of the metal sheets 2.

Figure 3:
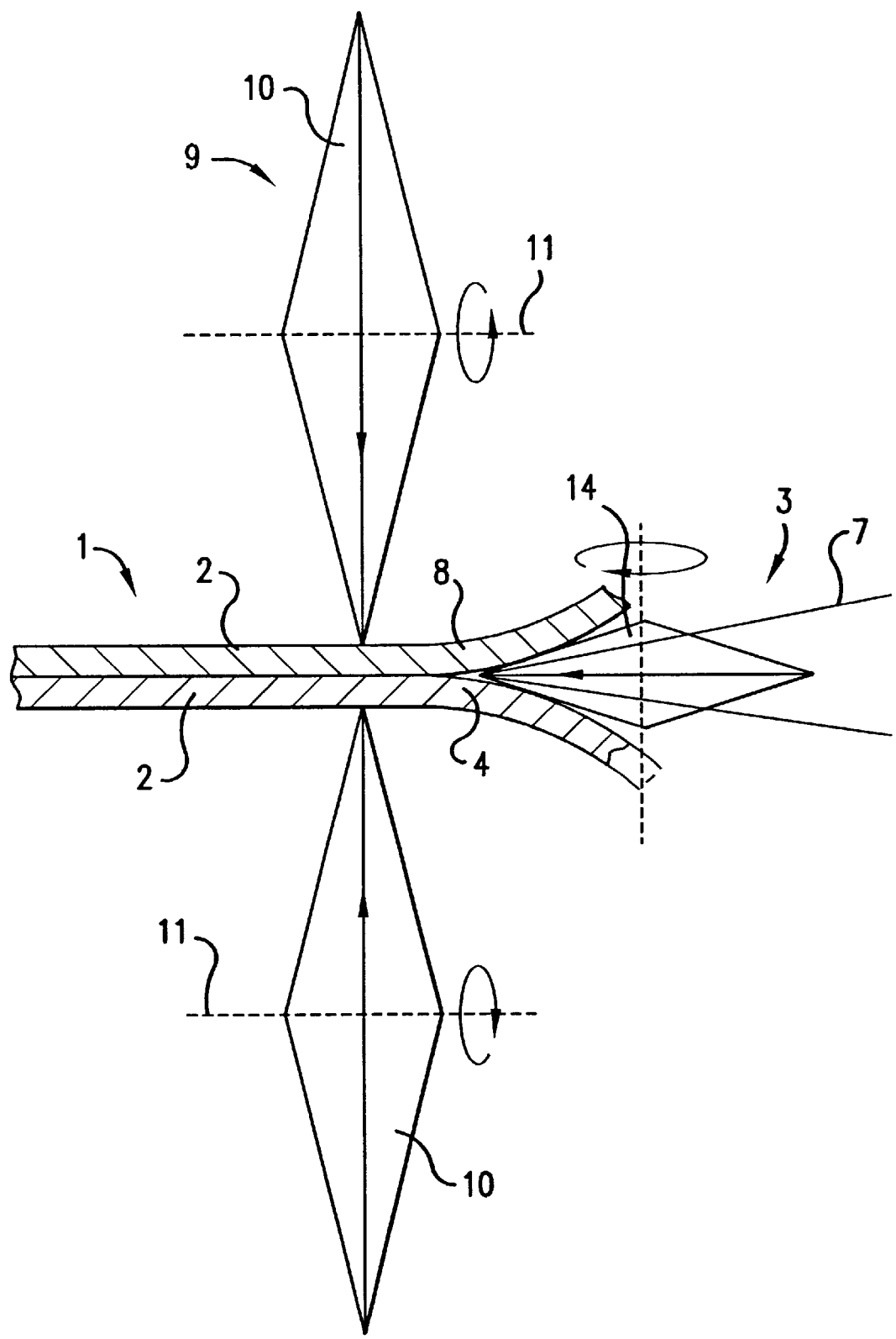
FIG. 3 is a view of a process for welding together two metal sheets by means of a laser beam with the aid of an arrangement according to the invention in a second embodiment

FIG. 3 shows a second embodiment of the spreading member 3. In this case, the spreading member 3 has a spreading roller 14 which travels along at the weld advancing speed. By means of the spreading roller 14, which rotates about its own axis, the metal sheets 2 are spread apart and flanged in a manner described above but with a lower expenditure of force and lower frictional forces. Another difference is that the spreading roller 14 has no bore 5 for the guiding through of the welding wire 6.

The spreading roller 14 will be used when no additional welding wire 6 is required and when the workpiece 1 can be welded by the melting-open of the material.

The spreading member 3, whose wedge angle in this application is between 15° and 80°, can be deflected transversely to the welding direction, whereby the two metal sheets 2 are flanged to a different degree.

The above-described process and the pertaining arrangement results in a flange seam 8 produced by the laser beam 7, in which case the position of the flange seam 8 can be controlled much better than by the previously known welding processes. Furthermore, in this case, expensive seam tracking or searching systems are not required.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for laser welding two metal sheets which overlap to form a flange seam and which are pressed together in the area of the flange seam during a welding operation, the metal sheets and a laser welding beam being moved relative to one another, and said laser welding beam being situated in a plane of the flange seam, said process comprising:

spreading apart edges of the respective metal sheets at a periphery of said flange seam by means of a wedge shaped spreading member, forming a gap adjacent said spreading member; and beaming the laser beam into the gap between the spread-apart edges of the metal sheets, at a position behind the spreading member in the welding direction.

2. An arrangement for laser welding two metal sheets which overlap to form a flange seam and which are pressed together in the area of the flange seam during welding operation, the metal sheets being moved relative to a laser welding beam situated in a plane of the flange seam, comprising:

a wedge-shaped spreading member arranged in front of a laser beam in a weld advancing direction, for spreading-apart metal sheets; and a pressing device abutted against a workpiece to be welded and the spread-apart metal sheets, which pressing device has contact pressure members which are arranged perpendicularly to the plane of the flange seam.

3. The arrangement according to claim 2, wherein the wedge-shaped spreading member is provided with a rounding on the side situated in the weld advancing direction.

4. The arrangement according to claim 2 wherein the wedge-shaped spreading member is provided with a bore which points to the weld and in which a welding wire is guided.

5. The arrangement according to claim 2, wherein the spreading member has one spreading roller which travels along at least approximately at the weld advancing speed.

6. The arrangement according to claim 2, wherein the pressing device has pressure rollers which travel along at the weld advancing speed and whose axes of rotation are situated in parallel to the plane of the flange seam.

7. The arrangement according to claim 3, wherein the pressing device has pressure rollers which travel along at the weld advancing speed and whose axes of rotation are situated in parallel to the plane of the flange seam.

8. The arrangement according to claim 3, wherein the wedge-shaped spreading member is provided with a bore which points to the weld and in which a welding wire is guided.

9. The arrangement according to claim 8, wherein the pressing device has pressure rollers which travel along at the weld advancing speed and whose axes of rotation are situated in parallel to the plane of the flange seam.

10. The arrangement according to claim 4, wherein the pressing device has pressure rollers which travel along at the weld advancing speed and whose axes of rotation are situated in parallel to the plane of the flange seam.

11. The arrangement according to claim 5, wherein the pressing device has pressure rollers which travel along at the weld advancing speed and whose axes of rotation are situated in parallel to the plane of the flange seam.

* * * * *